April 18, 1950    W. L. MORRISON, JR., ET AL    2,504,344
HANDLE FOR UTENSILS AND PRESTRESSED
ATTACHING MEANS THEREFOR
Filed Dec. 23, 1946
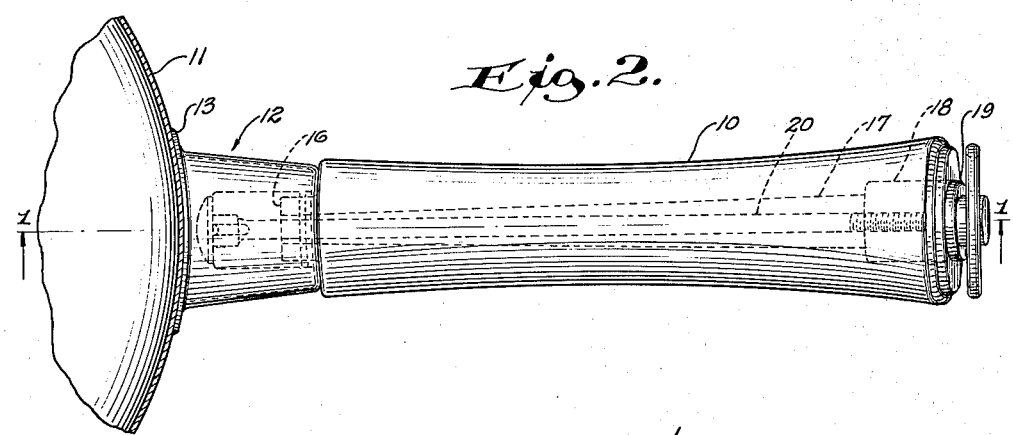
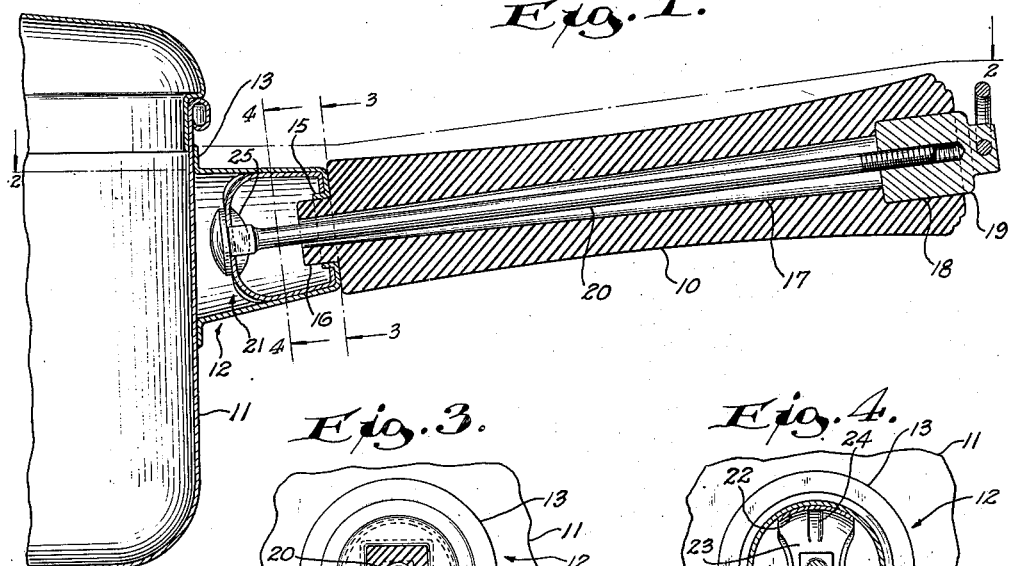
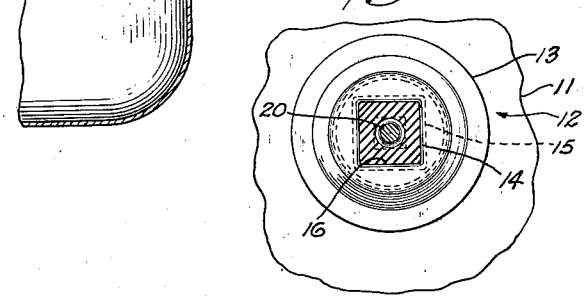
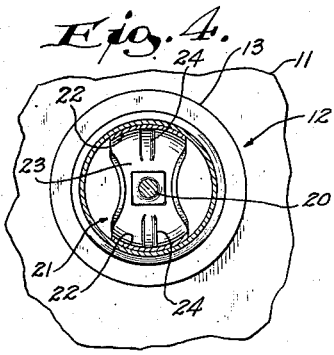
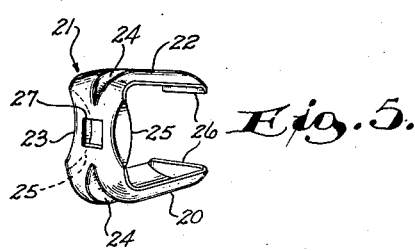
INVENTORS.
WILLARD L. MORRISON JR.
ARTHUR A. VANDELOO
BY John W. Michael
ATTORNEY.

Patented Apr. 18, 1950

2,504,344

UNITED STATES PATENT OFFICE 2,504,344

HANDLE FOR UTENSILS AND PRESTRESSED ATTACHING MEANS THEREFOR

Willard L. Morrison, Jr., and Arthur A. Vandeloo, West Bend, Wis., assignors to West Bend Aluminum Co., West Bend, Wis., a corporation of Wisconsin Application December 23, 1946, Serial No. 718,064

3 Claims. (Cl. 16—116)

1

This invention relates to improvements in handles for utensils, and especially to the means for attaching and holding heat-resistant handles to the walls of utensils.

Heat-resistant handles are held in place by rods, clamping tension being initially furnished by a threaded adjustment between the rod and the handle. After this clamping tension is applied it is only the inherent elasticity of the rod which maintains such tension when the handle length decreases because of shrinkage. Over a period of time the shrinkage in length of handles made of heat-resistant plastic is enough to offset the tension supplied by such elasticity and the rod fails to hold the handle tight.

It is an object of this invention, therefore, to provide a heat-resistant handle for a utensil which is so attached to the utensil that it will remain in tight engagement therewith if shrinkage of said handle occurs after installation.

This object is obtained by the use of an anchoring piece for the rod which has an arched bridge portion which deflects to a considerable extent as clamping tension is placed on the handle by the initial adjustment of the rod. The spring action obtained by the deflection of the bridge portion continues to maintain tension on the rod as the length of the plastic handle diminishes because of shrinkage. Thus, the tight engagement between the handle and the utensil will remain after installation.

The novel features, which are considered characteristic of the invention, are set forth with particularity in the appended claims. The invention itself, however, both as to its organization and its method of operation, together with additional objects and advantages thereof, will best be understood from the following description of a specific embodiment when read in connection with the accompanying drawings, in which:

Fig. 1 is a sectional view taken on the line 1—1 of Fig. 2 of a utensil having a heat-resistant handle and means of attaching it to a utensil embodying the invention;

Fig. 2 is a top plan view of the embodiment illustrated in Fig. 1;

Fig. 3 is an enlarged sectional view taken on the line 3—3 of Fig. 1;

Fig. 4 is an enlarged sectional view taken on the line 4—4 of Fig. 1; and

Fig. 5 is a perspective view of the anchoring piece forming a part of the invention.

Referring to the drawing by reference numerals, the handle 10, made of heat-resistant plastic, is in this embodiment attached to the side 11 of a stainless steel utensil. It may, however, be attached to other types of utensils. In any event, a metallic socket 12 is interposed between the utensil and the handle. It has a flange 13 which is spot-welded to the wall 11 to permanently secure the socket in place without marring the interior surface of the utensil. The socket 12 provides the support for the handle 10 which is held tightly against it by the rod 20. In order to prevent the handle from turning with respect to the socket, the end of the socket has a square-shaped opening 14 (see Fig. 3) provided with inturned edges 15. A projection 16 on the handle 10 fits snugly within the opening 14 to prevent relative rotation therebetween.

It is essential to continually clamp the handle 10 tightly against the socket 12. The initial clamping pressure is obtained by the rod 20 which extends from a socket 12 through an opening 17 in the handle. The outer end of the rod 20 is threaded and a nut 19, positioned in a counterbore 18 in the handle, screws on such end to initially clamp the handle against the socket 20. However, this initial clamping pressure will lessen as the length of the handle lessens due to shrinkage. To offset for such shrinkage the rod 20 is engaged in an anchor 21 which is designed to be pre-stressed by the initial clamping pressure and by reason thereof to continue to maintain clamping pressure as it is somewhat unstressed by such shrinkage of the handle.

The anchor 21 is formed of resilient metal and has a pair of legs 22 connected by a bridge portion 23. The juncture between the legs and the bridge may be reinforced by formed grooves 24 and the bridge may be strengthened by downwardly turned flanges 25. The bridge 23 is provided with a rectangular opening 27 which receives and engages the head of the rod 20 to prevent it from having relative rotation in respect to the anchor. The anchor 21 and the rod 20 are loosely positioned in the socket 12 before it is welded in place. In the normal position the legs 22 of the anchor are adjacent the inner walls of the socket while the feet 26 rest against the inside of its outer end. These feet 26 bear against the edges 15 to prevent the anchor 21 and hence the rod 20 from having rotation with respect to the socket 12 and handle 10.

The initial clamping pressure is applied by first turning the nut 19 until the handle 10 and socket 12 have been brought into surface-tosurface engagement. At this point there is slight tension applied to the rod 20. However, the nut 13 is thereafter tightened by turning it substantially another 90° to 180°. This increases the tension on the rod 20 and substantially deflects the bridge 23 prestressing it and bending it. There is thus impressed on the bridge 23 enough spring tension to take up any decrease in tension in the rod 20 resulting from the decreasing of the length of the handle 10 from shrinkage of the material thereof. Hence, the handle is maintained tightly clamped in place preventing the utensil from having a loose, uncertain feel when handled.

In the embodiment described herein, the legs 22 are shown in contact with the inner surface of the socket. This has a tendency to transmit some of the leg-spreading action, which takes place as the arch of the bridge 23 is depressed, to the walls of the socket 12, thus slightly springing these walls. The spring tension thus impressed may be also utilized the same as the spring tension in the anchor 21. However, it is not necessary that this contact be present as the bridge itself may be made sufficiently strong to provide all of the required prestressed spring tension.

The novel features, which are considered characteristic of the invention, are set forth with particularity in the appended claims. The invention itself, however, both as to its organization and its method of operation, together with additional objects and advantages thereof, will best be understood from the following description of a specific embodiment when read in connection with the accompanying drawing, in which:

We claim:

1. In a utensil having a wall, a hollow socket provided with an end and a flange, said flange being spot-welded to said wall to secure said socket to said utensil, said end having a non-circular opening therein with edges formed thereon, an anchor having a bridge and two spaced legs positioned within said socket, said legs abutting said end and contacting said edges to prevent relative rotation between said anchor and said socket, a rod non-rotatably secured to said bridge and extending outwardly through said opening, a heat-resistant handle positioned over said rod and having its inner end provided with a projection fitting within said opening, and an adjustable nut on said rod engaging the outer end of said handle to clamp said handle against said socket, said nut being initially adjusted to bend said bridge within the elastic limit thereof when said handle is initially clamped to said socket.

2. A handle for a utensil comprising a hollow socket engageable with a wall of a utensil, said socket having an end wall with a non-circular opening, a heat-resistant handle having a projection fitting within said opening to restrain relative turning thereof, an anchor in said socket formed of resilient metal and having a pair of spaced legs and a connecting bridge portion, said legs being spaced from and straddling said projection and resting on said end wall to support said bridge portion, said bridge portion between said legs having an arch, a rod secured to the central part of said bridge portion and extending outwardly through said handle, and a nut threadedly mounted on the outer end of said rod and clamping said handle against said end wall, said nut applying enough tension to said rod to bend said bridge portion within the elastic limit thereof and provide enough spring tension therein to take up any decrease in the length of said handle caused by shrinkage during normal usage.

3. A handle for a utensil comprising a hollow socket engageable with a wall of a utensil, said socket having an end wall with a non-circular opening, a heat-resistant handle having a projection fitting within said opening to restrain relative turning thereof, an anchor in said socket formed of resilient metal and having a pair of spaced legs and a connecting bridge portion, said legs being in contact with the inner surface of said socket and spaced from and straddling said projection, said legs terminating in inturned feet resting on said end wall to support said bridge portion, said bridge portion between said legs having an arch, a rod secured to the central part of said bridge portion and extending outwardly through said handle, and a nut threadedly mounted on the outer end of said rod and clamping said handle against said end wall, said nut applying enough tension to said rod to bend said bridge portion within the elastic limit thereof and spread said legs to apply pressure on the wall of said socket to slightly spring said wall and thereby providing enough spring tension in said bridge and wall to take up any decrease in the length of said handle caused by shrinkage during normal usage.

WILLARD L. MORRISON, JR.
ARTHUR A. VANDELOO.

REFERENCES CITED

The following references are of record in the file of this patent:

UNITED STATES PATENTS

| Number | Name | Date |
|---|---|---|
| 1,809,060 | Nelson et al. | June 9, 1931 |
| 2,193,290 | Mahoney | Mar. 12, 1940 |
| 2,234,097 | Tinnerman | Mar. 4, 1941 |